United States Patent [19]
Goyal et al.

[11] Patent Number: 6,055,579
[45] Date of Patent: Apr. 25, 2000

[54] DISTRIBUTED CONTROL AND SYNCHRONIZATION OF MULTIPLE DATA PROCESSORS USING FLEXIBLE COMMAND QUEUES

[75] Inventors: Girish Kumar Goyal, Fremont; Robert Anthony William, Los Altos; Michael Ken Minakami, Mountain View; David Allen Lockett, Los Gatos; Tarik Isani, Sunnyvale; Mark Paul von Gnechten, Fremont, all of Calif.

[73] Assignee: Silicon Graphics, Inc., Mountain View, Calif.

[21] Appl. No.: 08/971,261

[22] Filed: Nov. 17, 1997

[51] Int. Cl.[7] ........................................ G06F 15/80
[52] U.S. Cl. ................................... 709/400; 712/28
[58] Field of Search ..................... 395/551, 553, 395/200.78; 713/400; 709/400, 248, 5, 6, 201; 712/28

[56] References Cited

U.S. PATENT DOCUMENTS 5,603,063  2/1997  Au ............................................ 395/872
5,715,474  2/1998  Burke et al. .............................. 395/826

Primary Examiner—Thomas M. Heckler
Attorney, Agent, or Firm—Kenyon & Kenyon

[57] ABSTRACT

A system for synchronization of data processing in a data processing system including multiple command queues is disclosed. The disclosed data processing system includes one or more processing engines associated with one or more command queues. The use of multiple command queues supports multiple priority levels, such that commands in higher priority queues may preempt commands in lower priority queues. Data processing is synchronized by queue commands that allow a processing engine to queue commands on the command queue of any processing engine in the data processing system, including its own. Multiple data dependencies are resolved by conditional queue commands and event counters that queue a command only when all of the conditions precedent to execution of a particular data processing command are satisfied. The hardware queuing of the disclosed invention advantageously synchronizes data processing with minimal software supervision and with minimal latency.

14 Claims, 5 Drawing Sheets

DISTRIBUTED CONTROL AND SYNCHRONIZATION OF MULTIPLE DATA PROCESSORS USING FLEXIBLE COMMAND QUEUES

FIELD OF THE INVENTION

The invention relates generally to synchronization of data processing for multiple processors. More particularly, the invention relates to processing of data using unconditional and conditional queuing of processing commands in one or more queues for one or more processing engines in a data processing system.

BACKGROUND OF THE INVENTION

Data processing by multiple processing engines or processors such as encountered in, for example, video data processing, (e.g., multipass compositing), requires synchronization of the multiple processing engines. If the processing engines are not operating at the same speed (i.e., are not in lock step), then parallel processing generally, and video data processing in particular, requires extensive software overhead to coordinate processing activities and/or maintain data integrity.

For example, video data processing typically entails sending the video data being processed through multiple processing engines, particularly during multipass compositing. Separate data streams may be simultaneously processed by distinct processing engines and effective coordination of the different processing engines is required to prevent processing engines from idling and undesirably slowing the total rate of data processing throughput.

Video data processing frequently involves sequential processing of video data by different processing engines that are optimized for different processes. For example, one or more processing engines may be optimized for video input/output, a plurality of other processing engines may be optimized for image compositing, and one or more other processing engines may be optimized for interfacing with main memory. In order to composite images, such as for a cross fade of two images, it is necessary to receive the two images, perform any necessary color space conversion, execute the compositing pass (crossfade), and output the resultant image. Depending upon the number of available processing engines and the capabilities of the available processing engines, the process can be highly parallelized. However, there are significant data dependencies which must be coordinated for optimal execution.

For example, if processing engines optimized for image compositing only have access to local memory, then the images to be composited must be written to local memory. If the subsystem has two processing engines optimized for memory input/output, then these processing engines should concurrently execute the required main memory access. Because the two images may have different extents and the separate memory accesses may not take the same time, one image may be available for compositing several timing intervals before the second image is available. In typical prior art systems, however, the processing engine optimized for image compositing will remain idle waiting for the second image to be input and the system software to instruct the processing engine to begin execution of the image compositing process. Providing a processing engine with multiple processing queues allows the idle processing engine to execute background tasks during this idle time as background task operations may be queued in a lower priority queue. Moreover, relying upon the system software to initiate processing may unnecessarily postpone execution of one of the processes and requires substantial overhead processing which can introduce substantive delays. Accordingly, it is desirable to provide a mechanism by which the activities of the processing engines may be optimally coordinated without requiring software overhead.

This need for efficient coordination of data processing engines is particularly acute in the case of a video processing subsystem wherein the processing engines may have access to two separate memory systems; main memory and subsystem memory. Typically, access to the subsystem memory (also known as local memory) is accomplished with substantially less latency and at a higher throughput rate. Also, any intermediate results can be kept in subsystem memory, desirably saving a substantial amount of main memory bandwidth as only the final results have to be sent back to main memory. Coordinating the optimal use of the local memory space typically requires continuous monitoring of the processing engines to ensure that commands (and processing data) which will not be executed immediately are not occupying memory space which could be used for commands and processing data that could be used by an idled processing engine.

Various techniques have been used in the past to try and provide data to processing engines in a video subsystem in a timely fashion. Fixed pipelines have been implemented using specialized hardware to pass video image data through processing engines in a predetermined sequence. The fixed pipeline technique is generally disadvantageous because it is inherently inflexible and therefore cannot be adapted as video processing requirements change or in response to differing user needs and priorities.

Another technique used to coordinate processing engines is the implementation of expensive parallel processing systems with several microprocessors and an operating system modified (or constructed) for parallel processing. This technique, while flexible, is frequently costly, requiring an inordinate investment of resources. Furthermore, it may be unsuitable for a processing subsystem such as a video processing subsystem that may or may not operate in a parallel processing environment. In general, software-based processor coordination is less efficient than hardware-based processor coordination because of the processing overhead (both in terms of time and complexity) that is necessarily added by software coordination.

This is particularly problematic when highly optimized processing engines are used, as in many digital signal processing applications, and the software overhead and latency delays necessarily incurred by interrupt processing prevent efficient task overlapping because the time required for software execution becomes a significant portion of the total time required for processing. Video processing, especially real-time and faster than real-time video processing, is rapidly reaching the point where prompt and economically feasible coordination of processing engines is required to fully realize the capabilities of the processing engines.

SUMMARY OF THE INVENTION

In view of the foregoing, there is a need for a flexible system that synchronizes processing of data for multiple processing engines (or multiple processing queues for a single processing engine) in a data processing system such that processing time is optimized and processing engines are fully utilized with minimal software overhead and latency. By independently queuing commands to each processing engine, providing processing engines with the ability to queue commands without software intervention and by providing a mechanism by which individual commands may be conditionally queued, data dependencies between processing engines and within data streams can be fully resolved without requiring incorporation of complex data coherency systems.

The present invention can be readily implemented in any data processing system or subsystem with one or more processing engines. Each processing engine can queue commands on its own command queue(s) or on other processing engine command queues through a queue command. If centralized command control is desired, a command processor can control and maintain processing engine command queues.

Each processing engine has at least one command queue in which processing commands for that processing engine are queued. In an embodiment of the present invention, each processing engine has two command queues, a high priority command queue and a low priority command queue. The high priority command queue may be used for real time (or faster than real time) processing or other time sensitive commands which should be executed before the commands in the lower priority command queue for that processing engine.

Commands are grouped together in a list known as the command list. A command list contains one or more commands along with command parameters and attributes, such as whether an interrupt should be generated when the command is completed. The last command in a command list can be indicated by a specific END OF LIST command or by setting a LAST COMMAND attribute bit.

There are two categories of commands: queue management commands and processing commands. Processing commands may be specific to each processing engine (or type of processing engine) and are executed by a processing engine. Queue management commands are used to manage the command queues by, for example, adding commands to a processing engine command queue or initializing an event queue counter. One example of a queue management command is a QUEUE command that can queue a command list on a specific queue, either the queue in which the QUEUE command appears or on another queue which may be associated with another processing engine.

Another example of a queue management command is a CONDQUEUE command used to conditionally queue a command list if the queue conditions are met, such as when the event counter associated with the CONDQUEUE command reaches a trigger value such as zero. The CONDQUEUE command may first modify the value stored in the event counter and then, if the modified value of the event counter equals a trigger value, queue a specified command list on a specified command queue. For example, the CONDQUEUE command may decrement the event counter and, if the event counter is zeroed, a specified command list would be queued on a specified command queue. The CONDQUEUE command therefore provides a mechanism for managing multiple dependencies amongst the processing engines.

The command processor monitors and maintains a set of queue pointers in an embodiment of the present invention where the command queues are implemented as linked lists which are stored in a shared memory in a data processing system which may be a subsystem in multipurpose computing system such as, for example, a video data processing system. The individual elements of the command queues may be actual commands, including the command arguments, or, as in a preferred embodiment, the elements of the command queue may be command tokens and pointers to the command arguments. By using command tokens, the command queues can be advantageously implemented in fast local memory which can be integrated with the data processing subsystem because the memory size does not have to be large enough to accommodate all pending commands and data to be processed.

The command processor in a centralized data processing subsystem also interfaces with (or, in an alternative embodiment, has integrally incorporated with it) a command arbitrator. The command arbitrator provides a mechanism by which simultaneously pending command requests are serviced in a coherently arbitrated sequence as described below.

Accordingly, a data processing system with multiple processing engines can be readily implemented wherein the processing activities of the processing engines are efficiently coordinated for optimal data throughput with minimum idling of processing engines, software processing overhead and latency. Multiple data dependencies are readily resolved by the conditional queues and event counters disclosed herein. Efficient multiplexing of processing engines is further enhanced by the implementation of multiple command queues with varying priorities that provide a mechanism by which the present invention may be flexibly adapted to individual application requirements.

DETAILED DESCRIPTION

A novel technique and apparatus for synchronizing data processing for a plurality of command queues for one or more processors or processing engines in a data processing system is described herein. For purposes of example only, the detailed description of the present invention is presented primarily with respect to a video processing subsystem. However, the present invention is not limited to video data processing and is equally applicable to any form of digital signal processing or data processing wherein a plurality of data processing engines are utilized. Moreover, the present invention is not limited to data processing subsystems but is also applicable to independent data processing systems.

Figure 1:
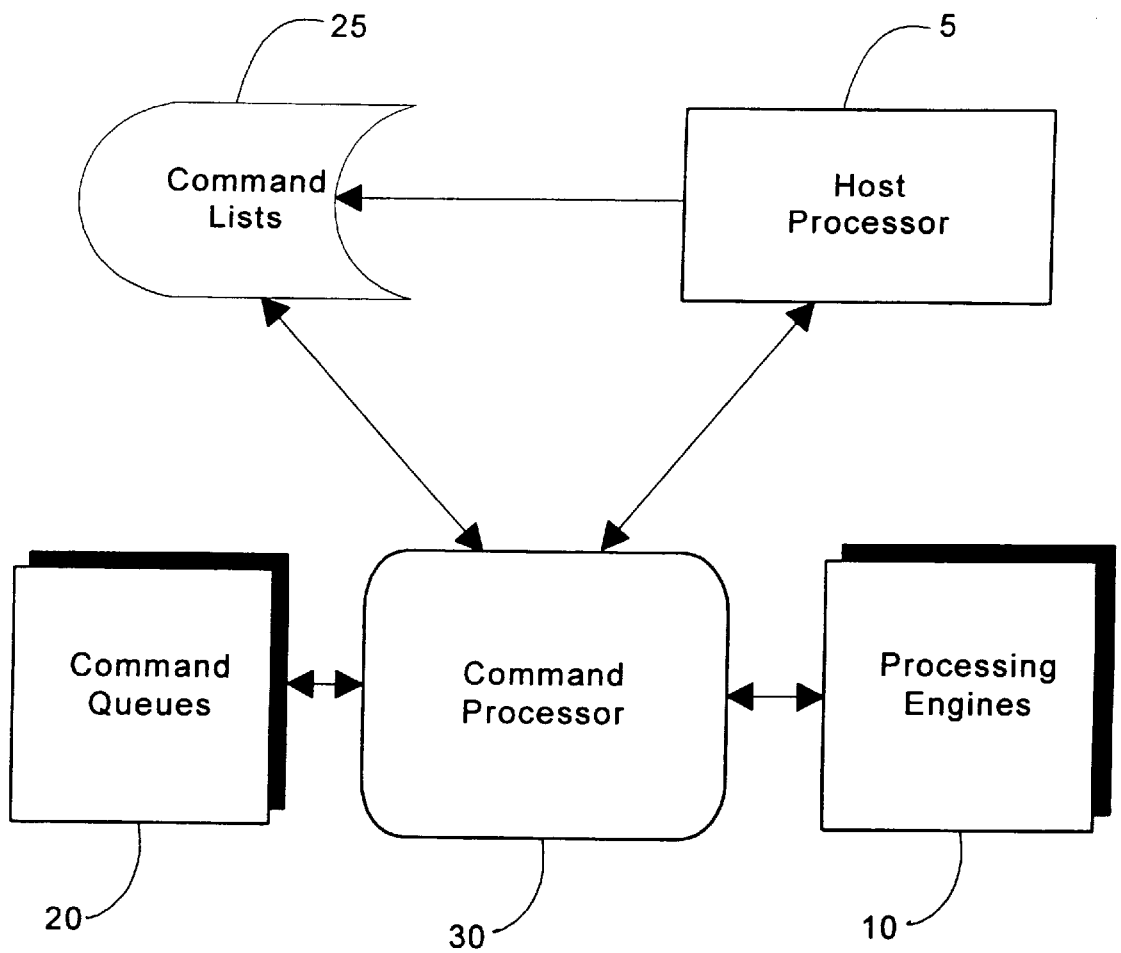
FIG. 1 is a schematic illustration of a data processing system incorporating an embodiment of the present invention.

The architecture of a data processing system in accordance with an embodiment of the present invention is illustrated in FIG. 1. The data processing system includes one or more processing engines 10 each of which is associated with one or more command queues 20. Each processing engine 10 can have a different number of associated command queues 20. For example, a first processing engine 10*a* may have one associated command queue 20*a*, a second processing engine 10*b* may have 3 associated command queues 20*b*–20*d*, and a third processing engine 10*c* may have two associated command queues 20*e*–20*f*. Alternatively, each processing engine may be associated with the same number of command queues.

The data processing system of FIG. 1 also includes a host processor 5. Host processor 5 builds command lists 25 in memory and queues the command lists 25 in command queues 20 through command processor 30. A command list is a set of processing commands executed by a processing engine 10 and/or queue management commands executed by command processor 30.

Command processor 30 communicates with host processor 5, command lists 25, processing engines 10 and command queues 20. Command processor responds to instructions from host processor 5 by queuing command lists 25 on command queues 20. Command processor 30 also maintains the command queues 20, fetches commands from memory and deliver them to processing engines 10.

In an embodiment of the present invention, command processor 30 fetches the next command in each command queue and delivers it to the processing engine when the processing engine indicates that the processing engine is ready to execute a new command. In a preferred embodiment of the present invention, command processor 30 may prefetch commands before they are needed in order to ensure processing commands are available to processing engines 10 as soon as a processing engine can execute the command and therefore reduce latency.

Each processing engine may be associated with a different number of command queues. In an embodiment of the present invention, each command queue associated with a processing engine has a predetermined priority relative to other command queues associated with that processing engine. For example, in an embodiment of the present invention in which two command queues are associated with a processing engine, one of the command queues would be a high priority command queue and the other command queue would be a low priority command queues. The only difference between the two command queues is the priority assigned to each command queue. Each command queue may hold identical commands in similar command lists and the commands would be processed identically except that commands in the higher priority command queue would be processed before commands in lower priority command queues.

For example, a high priority queue may be used for commands directed to data real-time processing which requires guaranteed performance whereas commands operating on data that does not require guaranteed performance or is not otherwise time-sensitive would be queued on a lower priority command queue. In a preferred embodiment of the present invention, a processing engine may preempt a currently executing command when a command is added to a higher priority command queue associated with that processing engine. Preemption may be selective, wherein the command from the higher priority queue preempts execution only after normal termination of the execution of the command from the lower priority queue or, alternatively, it may be abortive, wherein execution of the command being processed is stopped and processing of the command from the higher priority queue commences shortly thereafter.

The number of priority levels associated with a processing engine is limited only by the number of command queues associated that processing engine. Accordingly, the present invention is advantageously scalable for any number of priority levels.

Figure 2:
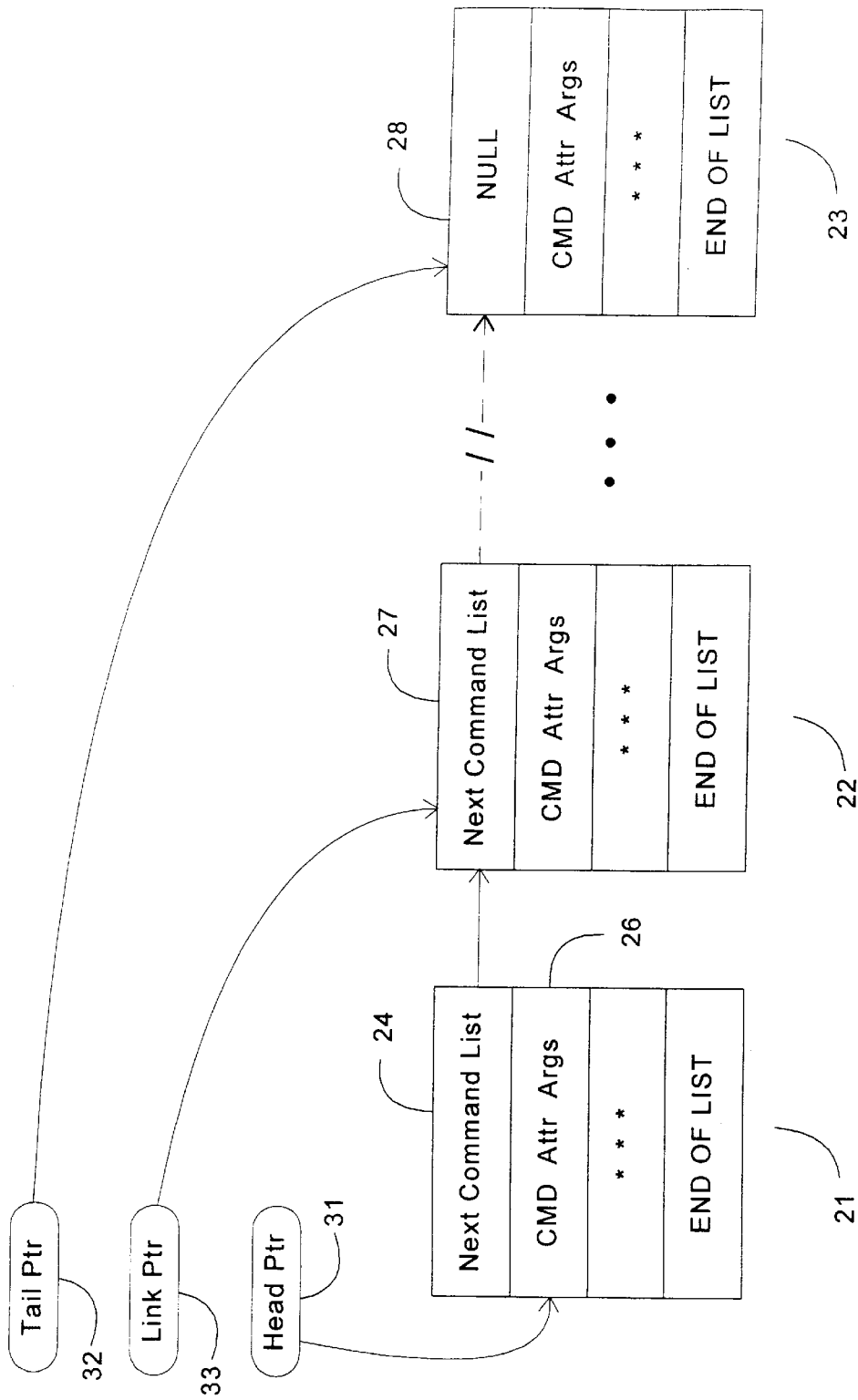
FIG. 2 is a diagrammatic representation of the command queue of an embodiment of the present invention.

In a preferred embodiment of the present invention, each command queue is maintained as a linked list data structure, specifically a singly linked list of command lists. Referring to FIG. 2, a command queue of a preferred embodiment is shown wherein command queue 20 is a singly linked list of command lists 21, 22, and 23. Each command list is a set of commands. A command list may have one or more commands, the size and composition of the command lists varying with the particular processing engine and various implementation specific system considerations. A command list may be constructed as any suitable data structure, including a linear queue or a linked list, although it is preferentially stored as a consecutive sequence of commands. Each command list may be stored in local memory or main memory.

In a preferred embodiment, the command lists are constructed to achieve maximum parallelization. During data processing, each processing engine sequentially executes the commands in the first command list in its highest priority command queue until the commands in the first command list have been executed or, in a selective preemption priority embodiment of the present invention, a command list has been placed in a higher priority command queue. Once the processing engine has completed executing the commands in its first command list, it begins executing the commands in the next command list in its highest priority non-empty command queue. If there are no command lists in any of its command queues, the processing engine continually checks its command queues for the next command list.

In a preferred embodiment, each command in a command list consists of an operation to be executed by the processing engine (or the command processor, if the command is a queue management command) identified by a command token, command attributes, and command arguments. Command arguments are, for example, pointers that point to control or data information needed by the identified operation. The types of command arguments are dependent upon the data being processed, the command being executed, and the system architecture. Accordingly, a command argument may be, for example, a data value or it may be a direct or indirect reference to an input/output port or an image in memory.

Referring to FIG. 2, in a preferred embodiment of the present invention, the first entry in each command list is a pointer 24, 27, and 28 to the next command list in the command queue and the last entry in each command list is an END OF LIST queue management command and. The END OF LIST command instructs command processor 30 to update the queue state and begin processing the next command list.

Each command queue 20 is controlled by two pointers that are maintained by the command processor 20, a head pointer 31 and a tail pointer 32. Head pointer 31 points to the command 26 in the first command list in the command queue that is being currently executed or is the next command to be executed. Tail pointer 32 points to the last command list 28 in the command queue 20. In a preferred embodiment, head pointer 31 and tail pointer 32, (the command queue state), are maintained as register variables in command processor 30 to minimize command queue management processing time.

When the data processing system is initialized, head pointer 31 and tail pointer 32 are set to null, indicating that the command queue is empty. When host processor 5 creates a command list and instructs command processor 30 to add the command list to an empty command queue, the command list is added to the command queue by updating tail pointer 32 to point to the first field in the command list (which is the first and last command list in the queue at that time). Head pointer 31 is updated to point to the first command in the command list. In a preferred embodiment of the present invention where head pointer 31 and tail pointer 32 are register variables in command processor 30, the corresponding registers are loaded with the addresses of the first field in the command list and the first command in the command list (i.e., the second entry in the command list as the first entry is reserved for a pointer to the next command list in the queue). If a command list is the only command list or the last command list in a command queue, the first entry is null.

When a new command list is added to a non-empty command queue by the host processor or the command processor, the new command list is linked to the command queue by updating the command entry pointed to by tail pointer 32 (i.e., the first entry of the last command list in the command queue) with the address of the first entry of the new command list. Tail pointer 32 is also updated to point to the first entry of the newly added command list.

In a preferred embodiment of the present invention, command processor 30 includes a third pointer, link pointer 33, associated with each command queue. Link pointer 33 minimizes memory references and latency by always pointing to the next command list 22 in each command queue. By so doing, link pointer 33 provides cache storage of the address of the next command list to be processed (i.e., the second command list) in every command queue which facilitates fetching the second command list when processing of the first command list is completed. Link pointer 33 is updated when head pointer 31 points to the end of the first (currently executing) command list or when a command list is added to a command queue which only has one command list queued. Referring to FIG. 2, link pointer 33 points to the first entry 27 of command list 22.

In an alternative embodiment, the command queues for the processing engines may be implemented as first in first out (FIFO) data structures. The use of FIFO data structures simplifies maintenance of the command queues by the command processor. However, it limits the length of each command queue to the predetermined size of each FIFO queue whereas linked list command queues are advantageously flexible and only constrained by the limits of the system memory.

Processing of data by various processing engines is advantageously accomplished in the present invention using QUEUE commands. A QUEUE command instructs the system to queue a command list identified in the QUEUE command arguments onto a command queue which identified in the queue command arguments. In a preferred embodiment of the present invention, the QUEUE command has two arguments: a pointer to the command list to be queued and a pointer to the command queue onto which the command list will be queued. By allowing one processing engine to queue commands for other processing engines, the operations of the processing engines can be optimally synchronized to minimize latency and idle processing engine cycles. Moreover, software overhead is advantageously minimized and the need for interrupt processing to initiate execution of sequential dependent data processing in multiple processing engines is obviated. Accordingly, the operation of the processing engines is effectively self-coordinated by hardware queuing capable of rapidly responding to changes in the states of the processing engines.

Figure 3:
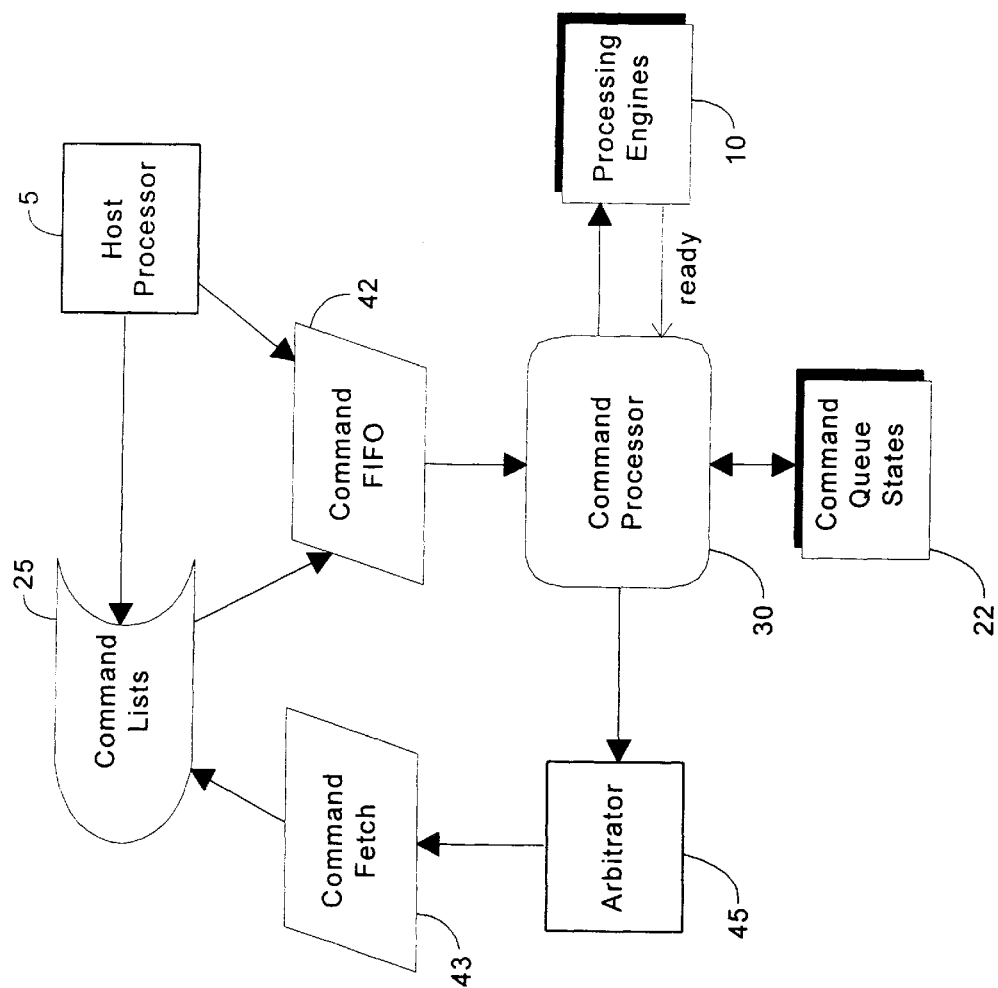
FIG. 3 is a schematic illustration showing additional details of the command processor of an embodiment of the present invention.

Referring to FIG. 3, operation of the command processor 30 is illustrated diagrammatically. When host processor 5 (or a processing engine 10) generates a new command list 25 and instructs command processor 30 to add the new command list to a command queue or when a processing engine 10 generates a ready signal indicating that the processing engine 10 is ready for the next command, command processor 30 examines the state 22 of each command queue associated with the processing engine 10. When a new command list is added, a determination is made as to whether the new command list is being added to the highest priority command queue, and, if so, the first command in the new command list is processed by command processor 30. If a processing engine 10 generated a ready signal, then command processor 30 processes the next command in the first command list in the highest priority command queue associated with processing engine 10.

Command processor 30 processes a processing command (as opposed to a queue management command) by examining the command queue state 22, particularly head pointer 31 which points to the command to be fetched for processing engine 10. Command processor 30 generates a command fetch request which is communicated to arbitrator 45. Arbitrator 45 arbitrates amongst concurrently pending command fetch requests and communicates a selected command fetch request to command fetch unit 43. Command fetch unit 43 fetches the command pointed to by head pointer 31 from command lists 25 and queues the fetched command on command FIFO queue 42. When the fetched command reaches the head of command FIFO queue 42, command processor 30 dispatches the command to processing engine 10. Command processor 30 then advances head pointer 31 to the next command in the command list. Whenever head pointer 31 points to the last command in a command list, indicated by either an END OF LIST command or an end of list attribute of the last command in the list, head pointer 31 is reset to point to the first command in the next command list as identified by the first entry in the command list and/or link pointer 33.

In an alternative embodiment of the present invention where there is no command request arbitration and each command fetch is executed immediately, the command processor can update the command queue by advancing the head pointer and other pointers as needed, when the command request is generated. However, in a preferred embodiment of the present invention it is considered possible that multiple command requests will be concurrently pending from different processing engines and therefore a system for arbitrating the command requests is required.

In one embodiment of the present invention, the arbitrator 45 may be a simple FIFO queue. In an alternative embodiment, pending command requests may be arbitrated on the basis of priority (e.g., command requests from high priority queues selectively preempt command requests from low priority queues) and/or the processing engine on which the command will be executed. Therefore, the arbitrator may provide round-robin or weighted round-robin servicing of the processing engine requests. Once arbitrator 45 arbitrates between competing command requests, the command is fetched from command lists 25 by command fetch unit 43.

Queue management commands (i.e., QUEUE) are handled differently from processing commands for processing engines. The command processor 30 processes queue management commands. For example, if a QUEUE command is encountered, the command processor places the command list identified by the QUEUE command into the command queue identified thereby, modifying the corresponding tail pointer 32 and first entry of the last command list in the command queue to point to the newly added command list. Depending upon the state of the command queue, head pointer 31 and link pointer 33 may also be modified as discussed above.

The present invention advantageously provides a mechanism for management of multiply dependent data processing such as may occur when a data processing operation by a particular processing engine cannot be initiated until two or more data processing operations are completed. Because it is difficult, if not impossible, to accurately predict the order and rate at which data will be processed by multiple processing engines, it is desirable to queue a multiply dependent command as soon as the last required data element is available. The conditional queue (CONDQUEUE) command provides this mechanism.

The conditional queue command is similar to the queue command but also includes an additional argument relating to the condition or predicate which must be met before the command list (or command) identified by the conditional queue command is queued on the command queue identified therein. In other words, the identified command list (or command) is queued when the identified condition is satisfied.

In a preferred embodiment, the condition or predicate is represented by an event counter. The event counter is initialized to a specific value representing the number of preceding events that must occur before the identified command list (or command) is queued on the identified command queue. A separate command initializes the event counter, and the additional conditional queue command argument is a reference to the event counter. Each time the conditional queue command is processed, the state of the referenced event counter is altered and examined.

In one preferred embodiment, the event counter is initialized to a positive integer value and decremented each time a conditional queue command referencing the event counter is processed. If the event counter is decremented to zero, the command list referenced in the conditional queue command arguments is queued on the command queue referenced in the conditional queue command arguments. A zero value in the referenced event counter indicates that the identified condition has been satisfied. Accordingly, the identified command list is queued when the identified condition is satisfied.

Figure 4:
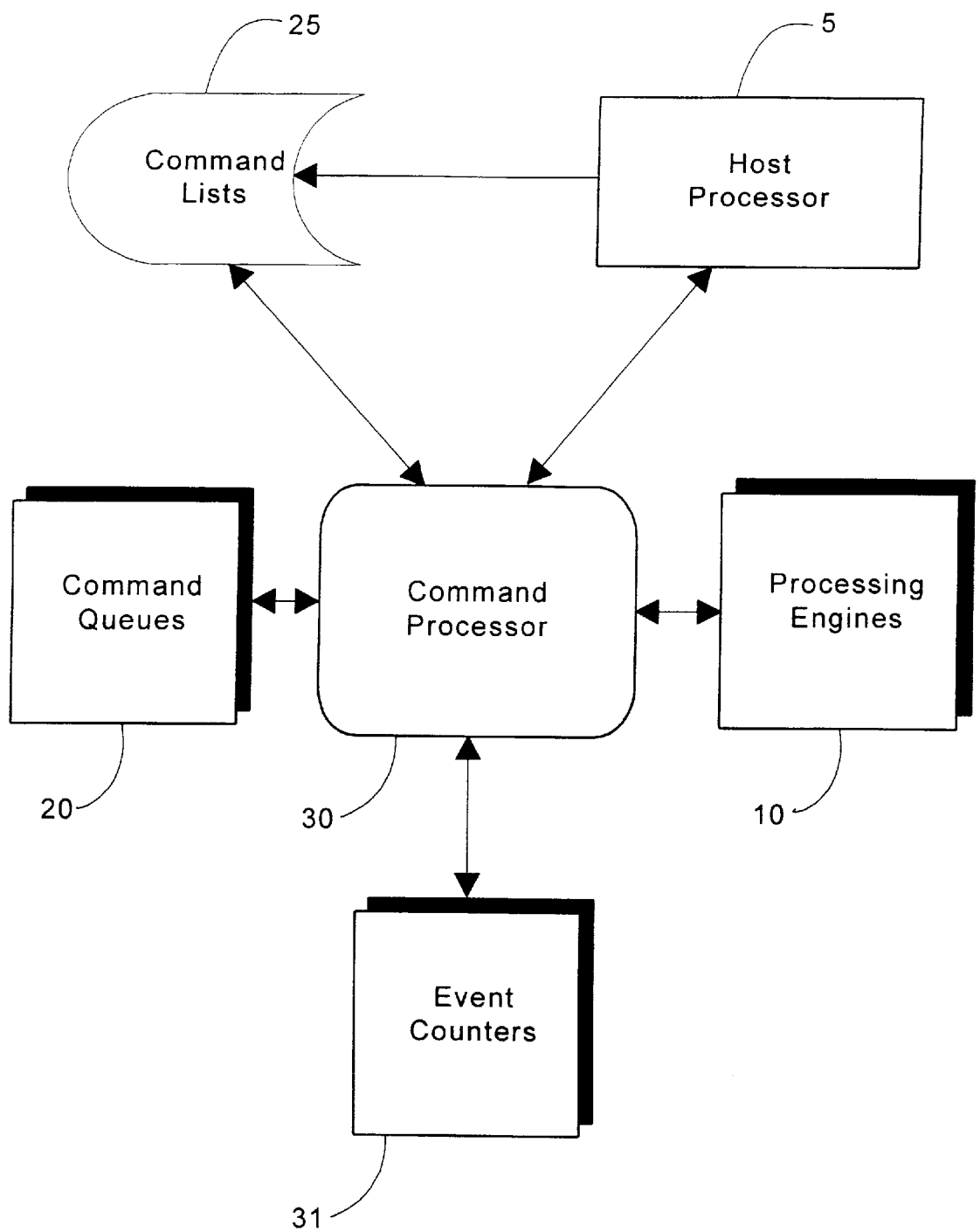
FIG. 4 is a schematic illustration of a data processing system incorporating an embodiment of the present invention present invention with conditional queuing.
Figure 5:
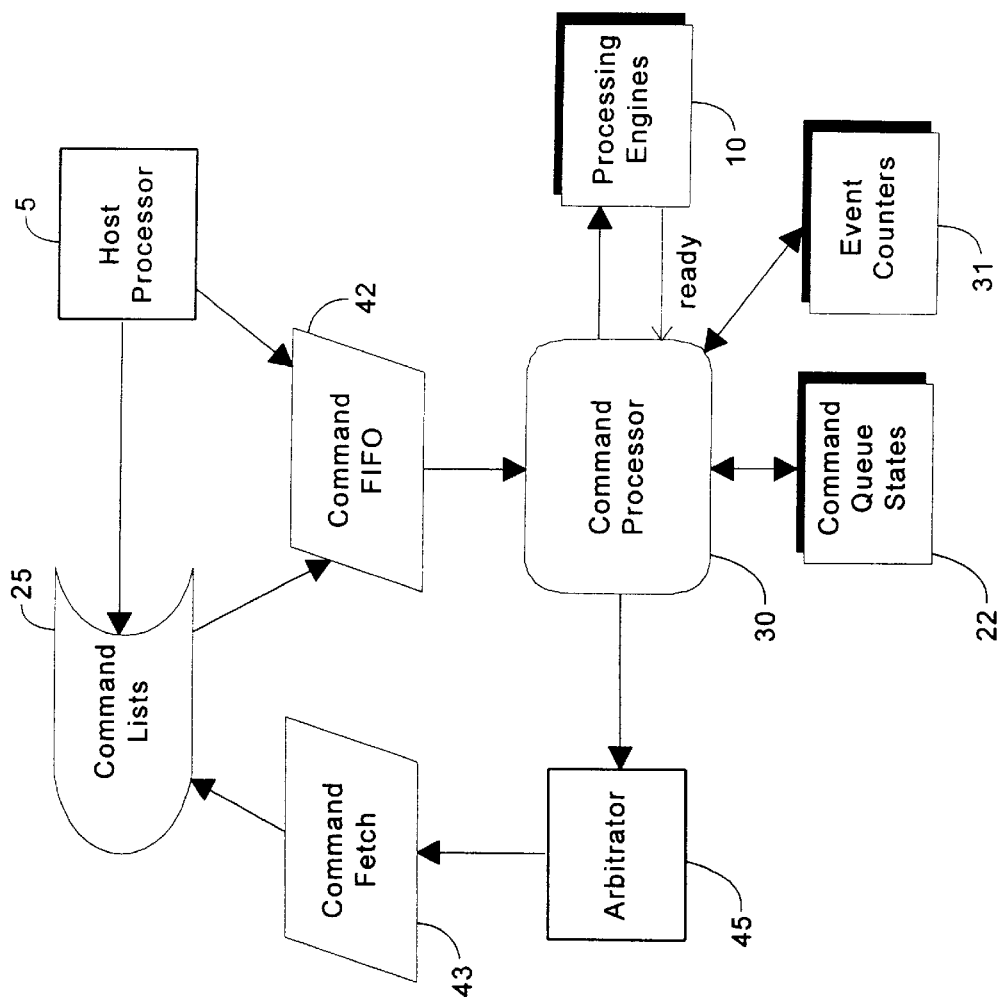
FIG. 5 is a schematic illustration showing additional details of the command interface of an embodiment of the present invention with conditional queuing.

Referring to FIG. 4 and FIG. 5, a modification to the data processing system of the present invention for implementation of conditional queue commands is shown. Specifically, a plurality of event counters 31 are operably coupled to command processor 30. In the illustrated embodiment, the condition precedent identified by the conditional queue command is the number of times conditional queue commands referencing the event counter must be executed before the command list identified by the conditional queue command is queued, although other conditions precedent may be defined and event counters 31 are not limited to integer processing.

In a preferred embodiment, a conditional queue may be set up (i.e., associated with an event counter initialized to a particular value) by either host processor 5 or an appropriate queue management command processed by command processor 30. Host processor 5 may set up the conditional queue when a command list is set up, instructing command processor 30 to initialize a specified event counter to a specified value. Alternatively, command processor 30 may initialize an event counter when a SET EVENT COUNTER command (wherein the event counter and initial value are identified by the command arguments) is encountered in a command queue. The event counter 31 is initialized to a value corresponding to the number of precedent events which must occur before the identified command list is queued on the identified command queue. Thereafter, the event counter is decremented every time a CONDQUEUE command associated with the event counter is processed by command processor 30. When the associated event counter reaches zero, the identified command list is queued on the identified command queue.

In alternative embodiments, the event counter may be incremented or otherwise modified by processing of a conditional queue command. Moreover, the trigger condition may be specified as something other than a zero value in the event counter. For example, conditional queue commands may be differentially weighted based upon the processing engine and/or priority of the command queue in which the conditional queue command is encountered, and execution of the queuing would then be conditioned upon equaling or exceeding a specified trigger value. Furthermore, the state of the event counter could be modified by commands other than conditional queue commands.

The present invention provides a mechanism by which a data processing system with a plurality of processing engines can obtain the benefits of parallel processing without extensive software overhead, undesirable idling of processing engines and performance hampering latency. Hardware queuing through queue commands and conditional hardware queuing through conditional queue commands ensure that processing engines are able to promptly respond as soon as data is available for processing, allowing for optimized execution without forced pipelines or inherently slower software-based coordination of the processing engines. Moreover, multiple priority command queues provide a mechanism by which guaranteed performance operations can be implemented in a data processing system without requiring extensive modifications or dedicated hardware.

Although various embodiments are specifically illustrated and described herein, it will be appreciated that modifications and variations of the present invention are covered by the above teachings and within the purview of the appended claims without departing from the spirit and intended scope of the invention. For example, distributed control could be implemented in lieu of a centralized command processor for coordination of command fetch requests and maintenance of command queues. Moreover, multiple priority levels could be implemented using a single command queue wherein high priority commands are inserted into the command queue at the head (or immediately behind the currently executing command list) and low priority commands are appended to the end of the command queue.

What is claimed is:

1. A data processing system comprising:

a host processor;

a plurality of processing engines coupled to said host processor;

a plurality of command queues capable of receiving, storing and retrieving a plurality of processing commands and queue management commands, each command queue associated with one of said plurality of processing engines; and a command processor that executes said queue management commands to manage said plurality of command queues; and dispatches said processing commands to said processing engines.

2. The system of claim 1 wherein said command processor manages said plurality of command queues by executing said queue management commands to queue or manipulate processing commands on said command queues.

3. The system of claim 1 wherein said command processor manages said plurality of command queues by executing said queue management commands to queue or manipulate queue management commands on said command queues.

4. The system of claim 1 wherein said command processor queues or manipulates said processing commands or said queue management commands on a first command queue.

5. The system of claim 4 wherein said command processor queues or manipulates said processing commands or said queue management commands on a second command queue.

6. A data processing system comprising:

a host processor;

a plurality of processing engines coupled to said host processor;

a plurality of command queues capable of receiving, storing and retrieving a plurality of commands, said commands including both processing commands and queue management commands, each of said command queues being associated with one of said plurality of processor engines; and a command processor executing said queue management commands, each of which has at least a command name argument and a command queue argument, said command name argument identifying at least one of said commands to be queued and said command queue argument identifying a command queue in which said at least one command is to be queued.

7. The system of claim 6 further comprising:

a conditional queue management command initialization establishing a condition precedent to queuing at least one of said commands in a command queue; and a conditional queue management command having a command name argument, a command queue argument, and a condition argument, said command name argument identifying at least one of said commands to be queued, said command queue argument identifying a command queue in which said at least one command is queued, and said condition argument identifying a condition precedent that must be met before at least one of said identified commands will be queued on said identified command queue.

8. The system of claim 7 wherein said condition precedent is a zero value contained in an event counter.

9. The system of claim 8 wherein said event counter is initialized to a positive integer value by said conditional queue command initialization and said event counter is decremented by said conditional queue command until the value of said event counter reaches zero.

10. The system of claim 6 wherein at least one of said plurality of processor engines is associated with a plurality of command queues and each of said plurality of command queues has a different processing priority.

11. The system of claim 6 wherein at least one of said plurality of processor engines is associated with a first command queue having a high priority and a second command queue having a low priority.

12. The system of claim 11 wherein said commands in said first command queue preempt said commands in said second command queue.

13. A method of distributing data processing in a data processing system having a host processor, a plurality of processing engines for executing processing commands, a command processor, and a plurality of command queues into which commands, including processing commands and queue management commands are queued, said method comprising:

queuing processing commands and queue management commands in said command queues wherein each command queue is associated with one of said plurality of processing engines; and executing queue management commands with said command processor, each of said queue management commands having a command argument and a command queue argument, said command argument identifying at least one of said commands to be queued and said command queue argument identifying one of said command queues in which said at least one command is queued whereby said at least one queued commands are associated with one of said plurality of processing engines.

14. The method of claim 13 further comprising:

executing a conditional queue management command initialization establishing a condition precedent to conditionally queuing at least one of said commands in a command queue; and executing a conditional queue management command having a command argument, a command queue argument, and a condition argument, said command argument identifying at least one of said commands to be queued, said command queue argument identifying a command queue in which said at least one command is queued, and said condition argument identifying a condition precedent that must be met before at least one of said identified commands will be queued on said identified command queue.

* * * * *